Patented Dec. 14, 1948

2,455,983

UNITED STATES PATENT OFFICE 2,455,983

PRODUCTION OF POLYMERS FROM CARBYLAMINE AND CARBOXYLIC COMPOUNDS

Henry Dreyfus, London, England; Claude Bonard administrator of said Henry Dreyfus, deceased, assignor to Celanese Corporation of America, a corporation of Delaware No Drawing. Application October 31, 1944, Serial No. 561,327. In Great Britain March 10, 1941

4 Claims. (Cl. 260—78)

This invention is concerned with improvements in the production of polymers, including polymers having film- or filament-forming properties, and with their use in the production of coating compositions, moulding powders, plastics, foils, films, sheets, filaments and other textile materials. The application is a continuation-in-part of my U. S. application Serial No. 429,105, filed January 31, 1942, now abandoned.

I have discovered that linear polymers having properties rendering them suitable for the production of industrial products such as those mentioned above may be obtained by heating one or more organic compounds containing carbylamine radicles and carboxyl radicles. On heating at suitable temperatures reaction takes place between the carbylamine and the carboxyl radicles, thus linking up the molecules or the organic compound or compounds to form long chain macro-molecules having the above-mentioned properties.

In order that linear polymers may be obtained the polymer-forming reagent or reagents employed must contain in each molecule two, and only two, reactive radicles, i. e. radicles which are capable of reaction under the polymer-forming conditions employed.

The production of the polymers is preferably affected by reaction between dicarbylamines and dicarboxylic acids, though mono-carbylamino-mono-carboxylic acids may also be employed. Whatever reagent or reagents are employed the reactive radicles are preferably linked by polymethylene radicles, examples of suitable compounds being ethylene, trimethylene, tetramethylene, pentamethylene, hexamethylene, octamethylene and other polymethylene dicarbylamines, particularly those containing from four to ten or fifteen carbon atoms in the polymethylene chain, the corresponding dicarboxylic acids and the corresponding carbylamino-mono-carboxylic acids., e. g. 1-carboxy-6-carbylamino-hexane, 1-carboxy-8-carbylamino-octane, 1-carboxy-9-carbylamino-nonane and 1-carboxy-13-carbylamino-tridecane.

The present invention is not however confined to the use of a reagent or reagents in which the reactive radicles are linked by polymethylene chains, and other aliphatic compounds may be employed or, alternatively, aromatic or heterocyclic compounds may be used. The reactive radicles in these compounds may be linked by hydrocarbon residues, as, for instance, in the derivatives of polymethylene compounds in which one or more of the hydrogen atoms attached to the carbon atoms are substituted by methyl, ethyl or other alkyl radicles, preferably alkyl radicles containing not more than 6 carbon atoms, or in compounds of the benzene, naphthalene or cycloparaffin series which contain two reactive radicles which are carboxyl and/or carbylamine radicles. Examples of such compounds are 1.3-dimethyl-glutaric acid, 2-methyl-adipic acid, 1.1- and 2.2-dimethyl-adipic acids, p-phenylene-diacetic acid, terephthalic acid, diphenic acid, 1.4-dicarbyl-amino-pentane, 1.4-dicarbylamino-2-methyl-butane, 2.5-dicarbylamino-hexane, 1.4-dicarbyla-mino-benzene, 1.4- and 1.5-dicarbylamino-naphthalenes and 2-carboxy-4'-carbylamino-diphenyl.

Again, compounds may be employed which contain oxygen, sulphur, nitrogen or other atoms in addition to carbon and hydrogen atoms in the organic residue to which the reactive radicles are attached. Here, again, aliphatic, aromatic or heterocyclic compounds may be employed, examples of such compounds being bis(carboxymethyl) ether, bis(2-carboxyethyl) ether, bis-(carboxymethyl) sulphide and sulphone, bis(2-carboxyethyl) sulphide and sulphone, bis(2-carboxyethyl) amine, 8 - (carboxymethylamino) naphthoic acid (1), bis(2-carbylaminoethyl) ether, sulphide and sulphone, bis(2-carbyl-aminoethyl) amine, 2.4' and 4.4'-dicarbylamino-diphenyl ether and 4.4' dicarbylamino-diphenyl sulphone.

A general method which may be employed for the production of carbylamines consists in reacting amines with chloroform in the presence of caustic alkali. Further details of this reaction are given in my Patent No. 2,347,772.

The production of polymers according to the present invention is carried out by heating the reagent or reagents at a suitable temperature, usually above 150° C. and preferably between 200 and 300° C., until a product having the required properties is obtained. When the reagent or reagents are liquid they may be reacted undiluted, but generally it is desirable to have present a liquid reaction medium, which may be either a solvent or a non-solvent for the reagent or reagents, e. g. an ether, benzene, toluene, xylene, decahydronaphthalene or other hydrocarbon, a cresol or cyclo-hexanol. Such a medium may be employed, for example, in an amount equal to 100 to 300% of the weight of the reagent or reagents. Most advantageously a solvent is used. The reaction may be started at a fairly low temperature, e. g. 100 or 150° C., and as the polymer builds up, the temperature may gradually be raised until a polymer of the required viscosity and molecular weight is produced. Ultimate temperatures of the order of 200, 250° C. or even 300° C. may be employed. It is, however, very important at all stages of the reaction to employ the lowest temperature possible consistent with a reasonable rate of polymerisation.

When raw materials of two different kinds are employed for the production of the polymers, for example a dicarboxylic acid and a dicarbylamine, it is important to use them in such proportions that the numbers of complementary radicles, (i. e. radicles which react together to link up the organic molecules), for example carbylamine radicles and carboxylic acid radicles, are substantially equal. The amount of the excess of one or other complementary radicle affects the maximum average molecular weight attainable and for the production of polymers of high molecular weight the numbers of complementary radicles should be very nearly equal, within say 2 to 1% or less depending on the molecular weight desired.

Where the reagent or reagents used for the polymers have very short chains joining their reactive radicles there may be a tendency to form cyclic compounds instead of or in addition to the polymer. This tendency shows itself when the structural unit of the polymer which could be formed has less than 7 atoms in its chain, and for this reason reagents are best chosen so that the structural unit of the polymer has at least 7 atoms in its chain and preferably 8 or more. For example when a dicarbylamine is reacted with a dicarboxylic acid it is desirable that the sum of the atoms in the chains joining the carbylamine radicles and the carboxyl radicles should be at least 4. If a carbylamino-acid is employed the number of atoms separating the carbylamine radicle from the carboxyl radicle is preferably at least 6.

It is important, especially for the production of polymers of high molecular weight, to employ raw materials of a high state of purity, or alternatively to apply a purifying treatment at a very early stage of the polymerisation. Generally, it is desirable to purify the raw materials as much as possible and in addition to carry out a purification treatment at an early stage. Thus it is desirable to effect a fractional precipitation or crystallisation when the viscosity of the polymer is quite low, for example when it has an intrinsic viscosity as defined below of the order of 0.1–0.2 or less. For example, the low polymer may be recrystallised or fractionally precipitated from a solution in a suitable solvent. In such fractionation, the first and last fractions should be discarded and only the middle fraction taken. Thus the first 10% and the last 10% may be discarded for purposes of the polymerisation, though naturally these discarded fractions may be further worked up with new raw materials. Such a purification may be applied at as early a stage as the formation of the intermediate compound obtained by union of two molecules only of the raw materials, for example one molecule of a polymethylene dicarbylamine with one of an aliphatic dicarboxylic acid.

As previously indicated, as the polymerisation proceeds the temperature may be raised, with the proviso that it is always desirable to maintain a reaction temperature as low as possible consistent with polymerisation taking place at a satisfactory rate and that it is always preferable to carry out the polymerisation at a low temperature for long periods rather than at high temperatures for short periods. Frequently it is convenient to carry out the polymerisation, particularly in its later stages, in a solvent or non-solvent diluent which boils at the temperature at which reaction is to occur. This procedure, conveniently carried out with the aid of reflux condenser, serves to fix the reaction temperature. Such a device may even be used when polymerising at successively higher temperatures. Thus, for example, the first stage of the polymerisation may be carried out at the boiling point of a low boiling diluent, a later stage at the boiling point of a higher boiling diluent, and so on. If desired, such a series of solvent or non-solvent diluents may be present from the beginning of the polymerisation and the diluents allowed to distil over, thus gradually raising the polymerisation temperature. Where high polymers are required, for example polymers with intrinsic viscosities of 1.0, 1.5 or more, it is best to carry out the whole of the polymerisation at temperatures not exceeding 190–200° C. Phenol or another solvent diluent of much the same boiling point is a convenient reaction medium for such a final reaction temperature.

The polymerisation reaction may be carried out at atmospheric pressure, especially under reflux as described above, or it may be carried out at any other desired pressure. It is important to carry out the reaction in the absence of an oxidising atmosphere in order to prevent or reduce colouration of the polymers. Thus, for example polymerisation may be effected in the presence of an atmosphere of oxygen-free nitrogen or other inert gas.

The recovery and purification of the polymer may be effected by various methods, the one chosen depending upon the state in which the crude polymer is obtained. If it is in suspension it may be separated from any liquid by filtration, dissolved, and then, after the solution has been filtered, precipitated by the addition of a non-solvent to the solution. If the polymer is in solution it may be precipitated by means of a non-solvent. Further purification if required can then be effected by solution and precipitation.

Generally with regard to the polymers, the invention includes the production of polymers of comparatively low degree of polymerisation, for instance for use in coating compositions, as well as polymers of higher degrees of polymerisation suitable for film- and filament-formation, having average molecular weights of at least 2,000 or 3,000, preferably of the order of 6,000, 10,000 or 12,000 or more, and melting points of about 200 to 250° C. The polymers usually begin to be fibre-forming when the intrinsic viscosity reaches a value of about 0.35–0.40, but stronger filaments can be obtained by continuing the polymerisation further, for example until the intrinsic viscosity of the polymer is of the order of 0.50, 0.80 or 1.0. In order to obtain polymers of high viscosity, for example having intrinsic viscosities of 0.60 and upwards, it is especially important to observe the precautions previously referred to, such as using the raw materials in a high state of purity or applying a purification treatment at an early stage and using throughout the condensation as low a temperature as possible consistent with a reasonable rate of reaction. For the purpose of the present specification, the intrinsic viscosity of a polymer is defined as $$\frac{\log_e \eta}{c}$$

where $\eta$ is the figure obtained by dividing the viscosity of a dilute solution of the polymer, e. g. a 2-3% solution of the polymer, by the viscosity of the pure solvent and $c$ is the concentration of the polymer in the solution in grams per 100 ccs. of solution.

If the polymers are produced from a reaction mass in which all the reactants contain two reactive radicles the molecules of the linear polymer produced must contain at each end a radicle which is still capable of reaction. The presence of such radicles is frequently undesirable, particularly where in working the polymers temperatures are used which are of the same order as those bringing about polymerisation. Accordingly it is desirable to apply what is known as a stabilisation treatment in order to prevent any such further polymerisation. This stabilisation may be effected by means of a small proportion of a reagent having only one reactive radicle capable of reacting with reactive radicles present in the polymer-forming reagents, for example carbylamino radicles or carboxyl radicles. Preferably relatively non-volatile reagents of this character are employed. Usually it is necessary only to have present a reagent which will react with one of the two types of complementary reactive radicles present in the reactive mass, since if this is rendered inactive the other member of the pair no longer has an opportunity for reaction. For example, in the case of polymers produced from dicarboxylic acids and dicarbylamines stabilisation may be effected by including in the reaction mass a small proportion of a higher aliphatic mono-carbylamine such as dodecyl-carbylamine, hexadecyl-carbylamine or octadecyl-carbylamine, or alternatively a relatively non-volatile mono-carboxylic acid may be employed such as stearic acid or palmitic acid. Generally a molecular proportion of 0.1 to 2% of stabiliser based on the quantity present of the reagent with which it is to react is sufficient, though smaller quantities may be used where very high viscosity polymers are desired, and larger quantities where low viscosity products are desired. Broadly speaking, the higher the proportion of stabilising agent the lower the average molecular weight and the lower the viscosity of the polymer which is produced.

Stabilising agents are preferably included in the original reaction mixture or introduced during polymerisation before the polymer has reached the desired viscosity.

Hitherto the invention has been described only in relation to the use of a single reagent containing a carbylamine radicle and a carboxyl radicle, or of two reagents one of which contains two carbylamine radicles and the other of which contains two carboxyl radicles. More than one reagent of either type may, however, be employed, for example, a dicarboxylic acid may be reacted with two different dicarbylamines, the proportion of dicarbylamine to dicarboxylic acid being such that the total number of carbylamine radicles is approximately equal to the number of carboxylic acid radicles, or a mixture of a dicarboxylic acid, a dicarbylamine and a carbylamino-mono-carboxylic acid may be reacted, again using the reagents in such proportions that the total number of carbylamine radicles is approximately equal to the number of carboxylic acid radicles.

Moreover, other polymer-forming reagents may be incorporated in the reaction mixture in addition to those characteristic of the present invention. For example mixed polymers may be produced from reaction mixtures containing dicarbylamines, dicarboxylic acids and diamines, or dicarbylamines, dicarboxylic acids and amino-carboxylic acids. Preferably the diamines and amino-carboxylic acids, as well as the other reagents, are polymethylene derivatives, e. g. hexamethylene and octamethylene diamines and 1-amino-octanoic acid(8), though other aliphatic amines and acids and aromatic and heterocyclic amines and acids may also be employed. In such reaction mixtures the carboxylic acid radicles are complementary both to the carbylamine radicles and to the amino radicles, and consequently the number of carboxylic acid radicles should be approximately equal to the sum of the carbylamine radicles and the amino radicles.

The following example is given to illustrate the invention.

*Example*

Equimolecular proportions of hexamethylene dicarbylamine and adipic acid were introduced into a vessel provided with a temperature recorder and an inlet and outlet for nitrogen and the vessel was then closed and oxygen-free nitrogen was passed through. After the air had been completely swept out of the autoclave, the vessel was heated slowly up to a temperature of 250° C. and maintained at that temperature for six hours, the current of nitrogen being continued throughout the reaction. The vessel was then allowed to cool and the contents removed. The polymer obtained, which was soluble in meta-cresol, had fibre-forming and cold-drawing properties.

The production of filaments, films or other shaped articles may be effected by extruding polymers of a suitable viscosity in a molten or plastic condition through a suitable shaping device. This is the so-called melt-spinning process. The melting-point of the polymer may, if desired, be somewhat reduced by the addition of a plasticiser, and particularly non-volatile phenols or sulphonamides. For the purpose of melt-spinning the polymer may be melted in a body of hot inert non-solvent diluent, for example a long-chain saturated hydrocarbon containing 30 to 40 carbon atoms. Thus, for instance, such a hot liquid may have a grid mounted below its surface so that pellets or flakes of polymer dropped into the hot liquid are prevented from sinking to the bottom until fully molten. A pool of molten polymer collects under the hot liquid and may be drawn directly into the inlet pipe of a spinning pump. This procedure facilitates starting up since, with the aid of such a hot liquid, the molten polymer is readily drawn into the pump. Alternatively, the dry-spinning process may be used, the polymer being dissolved in a suitable solvent which is evaporated from the filaments after their extrusion through the spinning nozzle. Highly concentrated solutions of the polymers, which are solid at ordinary temperatures, may be spun at elevated temperatures, and the extruded filaments set by mere cooling, after which the solvent may be washed out of the filaments. Lastly, the wet-spinning method may be used in which the polymer is dissolved in a suitable solvent and extruded through the spinning nozzle into a coagulating bath which dissolves out the solvent in the spinning solution but is a non-solvent for the polymer itself.

The strength of filaments and the like may be increased by stretching them, the stretching being carried out either in the cold or with heating, but in any case the temperature must not reach the melting-point of the polymer. The tenacity and extension of the filaments may be adjusted within wide limits by varying the amount of the stretch. By varying the amount of draw-down during the spinning or during a subsequent stretching, filaments may be produced which vary in denier along their length. The strength of films or foils may be increased by rolling them in the direction in which the increase of strength is desired.

Filamentary materials having a basis of a polymer may be used directly or after conversion into a staple fibre in the formation of yarns, threads and the like. These filamentary materials may be suitably twisted to form threads and the threads doubled or otherwise plied together, for example to form sewing threads. Effect threads or yarns may be produced by twisting or doubling the polymer threads with other polymer threads of the same or a different type, or, for example, with natural or artificial fibres such as acetate silk or viscose or other synthetic fibres, or with threads having a basis of a different material.

Continuous filaments or staple fibres having a basis of a polymer produced accordingly to the present invention may be subjected, either alone or in combination with other fibres, to an operation adapted to crimp them, such as a treatment with hot water or steam or with a swelling agent and/or passage through crimping rollers. In the crimped condition they may be employed for example, as wool substitutes, e. g. in yarns or felts, or as down substitutes, e. g. for stuffing cushions, or for heat insulation.

Yarns or threads containing the filaments may be used alone or in combination with yarns or threads of other materials, natural or artificial, for the production of a wide variety of knitted, woven or other fabrics, including pile fabrics in which the filaments may form either the pile or the backing or both.

Filaments and the like of higher denier may be employed in the production of brushes of various kinds, including tooth-brushes, and as substitutes for gut, e. g. in surgical sutures, musical instrument strings and fishing lines. With a view to simulating natural bristles suitable high denier continuous filamentary materials may be formed by an extrusion process in which regular variations in extrusion pressure or in draw-off speed are employed, so that the denier of the products fluctuates along their length and so that, on cutting the materials, the resulting bristles have an appropriate taper.

Among other uses of polymers produced according to the present invention is the production of ribbons, foils, sheets and films, for example for wrapping materials and for use in the photographic industry, including films for use in colour photography by the application of a series of suitable light-sensitive compositions. Films or sheet materials may be suitably worked, as by passing between suitably engraved rolls under pressure and, if desired, under the action of heat, to produce articles having the appearance of leather or the like, and they may also be employed as inter-layers for lamination, for example with glass or with fabrics of natural or artificial fibres or filaments.

Moulded articles having a basis of polymers may also be produced using the appropriate moulding methods or blanks may be machined to the desired shape.

The melting-points and other properties of the polymers may be modified in a large number of ways, quite apart from the possibility of employing particular polymer-forming reagents or mixtures. For example, two or more polymers may be mixed in various proportions to yield products having melting-points, solubilities and/or other characteristics different from those of the individual components, or one or more polymers may be mixed with polyamides, interpolyamide-polyesters or other synthetic polymeric materials. Again, the polymers may be compounded with cellulose derivatives, for example cellulose acetate, cellulose aceto-butyrate, cellulose aceto-stearate, ethyl cellulose and hexyl cellulose, with rubber or other natural or artificial rubber-like material, e. g. polybutadiene and co-polymers thereof, polyvinyl chloride, polyvinylidene chloride and polystyrene, with proteins, with cork, especially for the production of substitutes for linoleum or other floor-covering, and with various natural or synthetic resins, e. g. shellac and phenol-formaldehyde resins. Abrasive materials may be bonded by means of the polymers.

By virtue of the possibility of dispersing the polymers in particulate form in various media, it is possible to colour various artificial materials by incorporating, for example, in a viscose or cellulose acetate spinning solution a small proportion of dispersed polymer particles which have been coloured by suitable dyestuffs. The dispersed coloured particles may thus be uniformly distributed throughout the artificial materials produced and so confer upon them a substantially permanent colouration. Advantageously, when this method of colouring artificial materials is adopted, the polymer employed as the colouring agent is of relatively low molecular weight, e. g. between 500 and 2,000.

Polymer compositions from which shaped articles or coated or other products are produced may contain plasticising agents or like softening agents. The compositions may also contain delustring, pigmenting and/or loading agents, either inorganic or organic; among delustring agents may be mentioned titanium dioxide, barium sulphate, diphenyl and chlorinated diphenyls, among pigmented agents carbon black and the pigment dyestuffs, and among loading agents tin phosphate. By forming filaments, films or other like articles from compositions containing suitable incompatible polarising substances, e. g. asymmetric dichroic crystals, in finely divided form, and subjecting the shaped articles to a substantial drawing operation in order to orientate both the molecules of the polymer and the particles of the crystalline polarising agent itself, it is possible to produce polarising materials, the uses of which are well-known in the art. The properties of the products may also be modified by incorporating other substances in the compositions, e. g. oils, waxes and resins.

Such agents as those referred to in the preceding paragraph may be incorporated in the prepared polymer or, where feasible, in the formed articles, especially with the assistance of a swelling agent for the polymer. Where their stability permits, they may also be incorporated in the reaction mass from which the polymer is produced, especially at a stage when polymerisation has proceeded to a limited extent. Plasticising or other swelling agents may advantageously be selectively absorbed by the formed articles from solution in a liquid which is substantially a non-solvent for the polymer.

Delustring of the polymer products may also be achieved by subjecting them to the surface action of an acidic agent, for example an acidylating agent such as acetic anhydride, or sulphuryl chloride or other reagent capable of chemical combination with the polymer. Such a treatment may also serve to increase the surface friction of the materials and, in the case of fabrics, to improve their resistance to yarn slippage and to creasing. Again, they may be subjected to surface abrasion.

For the purpose of rendering the materials less liable to creasing or to delustre them or for the purpose of rendering crimp more permanent, synthetic resins may be produced in or on the filaments of the material, for example resins of the urea-formaldehyde, phenol-formaldehyde or melamine-formaldehyde types. Usually it is best to impregnate the materials with a water-soluble early condensation product of the resin-forming reagents and to bring about the final condensation upon the materials, for example by baking.

Colouration of the polymer materials may be achieved by dyeing as well as by the pigmenting methods referred to. For example, the materials may be coloured by means of dispersed insoluble dyestuffs developed for acetate silk and vat dyestuffs, especially anthraquinone dyestuffs, whether applied as such or produced on the material from suitable components including naphthol AS components. Dyestuffs or pigments which are sufficiently resistant to the temperature and other conditions of spinning may be introduced into the spinning dope or melt containing the polymer so as to produce coloured filaments, bristles or the like.

After shaping, especially in the form of filamentary or film-like products, the shape of the products may be set by a number of processes, such as, for example, steaming, especially at a temperature of above 100° C., while the products are maintained in the shape which it is desired to render substantially permanent. Setting treatments of this nature are especially applicable to bristles in order to increase their tendency to recover after deformation, to knitted fabrics to render the stitch-shape permanent, and to crimped or wool-like materials in order to render the crimp substantially permanent. It may suitably be applied as a boarding treatment to knitted stockings. Crimping itself may be brought about by the action of solvents or swelling agents for the polymers, as by treatment with water at a moderate temperature, or by mechanical means, such as by passing the materials between intermeshing toothed rolls. Another method by which staple fibre, in particular, may be crimped consists in compressing an irregularly disposed mass of staple fibre and steaming it, or otherwise setting the shape, while it is so compressed.

Having described my invention, what I desire to secure by Letters Patent is:

1. Process for the production of linear polymers of high molecular weight, which comprises heating a reaction mass wherein the polymer-forming molecules each contain two, and only two, reactive radicles, the total number of reactive radicles being made up of approximately equal numbers of carbylamine and carboxyl radicles, all said polymer-forming molecules which contain pairs of dissimilar reactive radicles being such that said radicles are joined by a chain of at least 6 atoms, and all said polymer-forming molecules which contain pairs of similar reactive radicles being such that, in any two mutually reactive molecules, the sum of the number of atoms in the chain joining a pair of carbylamine radicles and of the number of atoms in the chain joining a pair of carboxyl radicles is at least 4.

2. Process for the production of linear polymers of high molecular weight, which comprises heating a mixture consisting of approximately equimolecular proportions of a dicarboxylic acid and a di-carbylamine, the carboxyl and the carbylamine radicles being the sole reactive radicles in said acid and said dicarbylamine respectively, and the sum of the number of atoms in the chain joining the carboxyl radicles in the acid and of the number of atoms in the chain joining the carbylamine radicles in the di-carbylamine being at least 4.

3. Process for the production of linear polymers of high molecular weight, which comprises heating a reaction mixture consisting of a mono-carbylamino mono-carboxylic acid, the carboxyl and the carbylamine radicles being the sole reactive radicles in said acid, and the number of atoms in the chain joining the carboxyl radicle and the carbylamine radicle in the acid being at least 6.

4. Process for the production of linear polymers of high molecular weight, which comprises heating at a temperature of 200 to 300° C. a reaction mass wherein the polymer-forming molecules each contain two, and only two, reactive radicles, the total number of reactive radicles being made up of approximately equal numbers of carbylamine and carboxyl radicles, all said polymer-forming molecules which contain pairs of dissimilar reactive radicles being such that said radicles are joined by a chain of at least 6 atoms, and all said polymer-forming molecules which contain pairs of similar reactive radicles being such that, in any two mutually reactive molecules, the sum of the number of atoms in the chain joining a pair of carbylamine radicles and of the number of atoms in the chain joining a pair of carboxyl radicles is at least 4 heating being continued until a polymer having fiber-forming properties is obtained.

HENRY DREYFUS.

REFERENCES CITED

The following references are of record in the file of this patent:

UNITED STATES PATENTS

| Number | Name | Date |
| --- | --- | --- |
| 2,285,009 | Brubaker et al. | June 2, 1942 |

OTHER REFERENCES

Richter, Organic Chemistry (Spielmann Second Ed.), vol. 1, page 248.